United States Patent
Lin et al.

(10) Patent No.: US 10,475,410 B2
(45) Date of Patent: Nov. 12, 2019

(54) LIQUID CRYSTAL DISPLAY PANEL AND LIQUID CRYSTAL DISPLAY DEVICE WITH EXTRA DATA SIGNAL

(71) Applicants: AU Optronics Corporation, Hsin-Chu (TW); National Cheng Kung University, Tainan (TW)

(72) Inventors: Chih-Lung Lin, Tainan (TW); Po-Syun Chen, Tainan (TW); Cheng-Chiu Pai, Hsin-Chu (TW)

(73) Assignees: AU OPTRONICS CORPORATION, Hsin-Chu (TW); NATIONAL CHENG KUNG UNIVERSITY, Tainan (TW)

( * ) Notice: Subject to any disclaimer, the term of this patent is extended or adjusted under 35 U.S.C. 154(b) by 60 days.

(21) Appl. No.: 15/804,154

(22) Filed: Nov. 6, 2017

(65) Prior Publication Data
US 2019/0012977 A1     Jan. 10, 2019

(30) Foreign Application Priority Data
Jul. 4, 2017    (TW) .............................. 106122321 A

(51) Int. Cl.
    *G09G 3/36*       (2006.01)
    *G02F 1/1345*     (2006.01)
    *G02F 1/1368*     (2006.01)
    *G02F 1/133*      (2006.01)

(52) U.S. Cl.
CPC .......... *G09G 3/3677* (2013.01); *G02F 1/1368* (2013.01); *G02F 1/13306* (2013.01); *G02F 1/13458* (2013.01); *G09G 3/3648* (2013.01); *G09G 3/3688* (2013.01); *G09G 2300/0426* (2013.01); *G09G 2310/027* (2013.01); *G09G 2310/08* (2013.01)

(58) Field of Classification Search
CPC .......... G09G 3/3688; G09G 2300/0426; G02F 1/136286; G02F 1/134309
See application file for complete search history.

(56) References Cited

U.S. PATENT DOCUMENTS

| | | | |
|---|---|---|---|
| 2007/0146155 A1* | 6/2007 | Moon .................. | G09G 3/3648 340/691.6 |
| 2008/0239225 A1* | 10/2008 | Chen .................. | G02F 1/13394 349/139 |
| 2009/0128466 A1 | 5/2009 | Chung et al. | |

(Continued)

FOREIGN PATENT DOCUMENTS

| | | |
|---|---|---|
| TW | 200923899 A | 6/2009 |
| TW | 201516998 A | 5/2015 |

OTHER PUBLICATIONS

Taiwan Intellectual Property Office, "Office Action" dated Oct. 3, 2017, Taiwan.

*Primary Examiner* — Yuzhen Shen
(74) *Attorney, Agent, or Firm* — WPAT, PC

(57) ABSTRACT

An Liquid crystal display panel is provided. The Liquid crystal display panel includes a plurality of pixel elements arranged as a pixel array. The Liquid crystal display panel receives a plurality of data signals, a plurality of gate driving signals, a plurality of control signals, and an extra data signal. Each of the gate driving signals includes a gate pulse; each of the data signals includes a data voltage; the extra data signal includes a data voltage; and each of the control signals includes a gate pulse and a data voltage.

14 Claims, 7 Drawing Sheets

(56) References Cited

U.S. PATENT DOCUMENTS

2015/0103038 A1    4/2015   Han et al.
2015/0302811 A1  10/2015   Park
2016/0189650 A1    6/2016   Lee et al.
2017/0047034 A1*  2/2017   Nishiyama ............... G09G 3/20

* cited by examiner

LIQUID CRYSTAL DISPLAY PANEL AND LIQUID CRYSTAL DISPLAY DEVICE WITH EXTRA DATA SIGNAL

BACKGROUND

Technical Field

The present invention relates to a display apparatus, and in particular, to a high-resolution Liquid crystal display panel and a high-resolution Liquid crystal display device.

Related Art

Referring to FIG. 1, FIG. 1 is a schematic diagram of a conventional Liquid crystal display device. The Liquid crystal display device 100 includes an Liquid crystal display panel 110 and a data driving circuit 120. The Liquid crystal display panel 110 includes a gate driving circuit 102 and pixel elements p11 to p44, and the pixel elements p11 to p44 are of a same structure and each include a switching transistor, a liquid crystal capacitor, and a storage capacitor.

Further, the gate driving circuit 102 generates gate driving signals G_1 to G_4, and the data driving circuit 120 generates data signals D_1 to D_4.

The pixel elements p11 to p44 are arranged as a pixel array. Using FIG. 1 as an example, the pixel elements p11 to p44 are arranged as a 4×4 pixel array. Each row of pixel elements receive identical gate driving signals G_1, G_2, G_3, and G_4, and each column of pixel elements receive identical data signals D_1, D_2, D_3, and D_4.

The first row of pixel elements p11 to p14 are used as an example for description. When gate terminals of the switching transistors in the pixel elements p11 to p14 are enabled in response to receiving a gate pulse of the gate driving signal G_1, the storage capacitor and the liquid crystal capacitor in the pixel element p11 receive a data voltage of the data signal D_1, the storage capacitor and the liquid crystal capacitor in the pixel element p12 receive a data voltage of the data signal D_2, the storage capacitor and the liquid crystal capacitor in the pixel element p13 receive a data voltage of the data signal D_3, and the storage capacitor and the liquid crystal capacitor in the pixel element p14 receive a data voltage of the data signal D_4. Certainly, the other rows of pixel elements also have the same connection relationship and operation principle, and details are not described herein again.

Basically, each of the gate driving signals G_1 to G_4 of the gate driving circuit 102 sequentially produces a gate pulse, to sequentially enable pixel elements of the same row in the pixel array.

For example, when the gate driving signal G_1 produces a gate pulse, the first row of pixel elements p11 to p14 are enabled, and the data voltages of the data signal D_1 to D_4 are correspondingly stored in the pixel elements p11 to p14. Further, when the gate driving signal G_2 produces a gate pulse, the second row of pixel elements p21 to p24 are enabled, and the data voltages of the data signal D_1 to D_4 are correspondingly stored in the pixel elements p21 to p24, and so on.

In a high-resolution Liquid crystal display device, for example, an Liquid crystal display device with a frame rate of 120 Hz and a resolution of 8K or 4K, the time for writing a data signal is approximately 1.9 μs. Therefore, a data voltage of the data signal cannot be completely written due to the load effect, resulting in gray-scale distortion and consequently affecting the picture quality of the Liquid crystal display device.

SUMMARY

An objective of the present invention is to provide an Liquid crystal display device with a new architecture, an Liquid crystal display panel of which including a gate driving signal, a data signal, and a control signal. The control signal includes a gate pulse and a data voltage, the gate pulse is used for enabling a pixel element, and the data voltage is stored in a liquid crystal capacitor and a storage capacitor.

The present invention provides an Liquid crystal display panel, including a plurality of pixel elements arranged as a pixel array, where the pixel array includes: a $(2n-1)^{th}$ row, having m pixel elements p[(2n-1),x], where n and m are positive integers, and x is any positive integer from 1 to m; and a $(2n)^{th}$ row, having m pixel elements p[(2n),x], where scan terminals of the m pixel elements p[(2n-1),x] in the $(2n-1)^{th}$ row all receive a gate driving signal G_n; a data terminal of a pixel element p[(2n-1),x] in the $(2n-1)^{th}$ row receives an extra data signal, and x equals to n; data terminals of the other (m−1) pixel elements p[(2n-1),x] in the $(2n-1)^{th}$ row correspondingly receive $x^{th}$ control signals, and x does not equal to n; data terminals of the m pixel elements p[(2n),x] in the $(2n)^{th}$ row receive an $n^{th}$ data signal; and scan terminals of the m pixel elements p[(2n),x] in the $(2n)^{th}$ row correspondingly receive the $x^{th}$ control signals.

The present invention provides an Liquid crystal display panel, including a plurality of pixel elements arranged as a pixel array, where the Liquid crystal display panel receives a plurality of data signals, a plurality of gate driving signals, a plurality of control signals, and an extra data signal; the gate driving signals include gate pulses; the data signals include data voltages; the extra data signal includes a data voltage; and the control signals include gate pulses and data voltages.

For a better understanding of the foregoing and other aspects of the present invention, a detailed description is given below by using examples with reference to the accompanying drawings.

DETAILED DESCRIPTION

Figure 1:
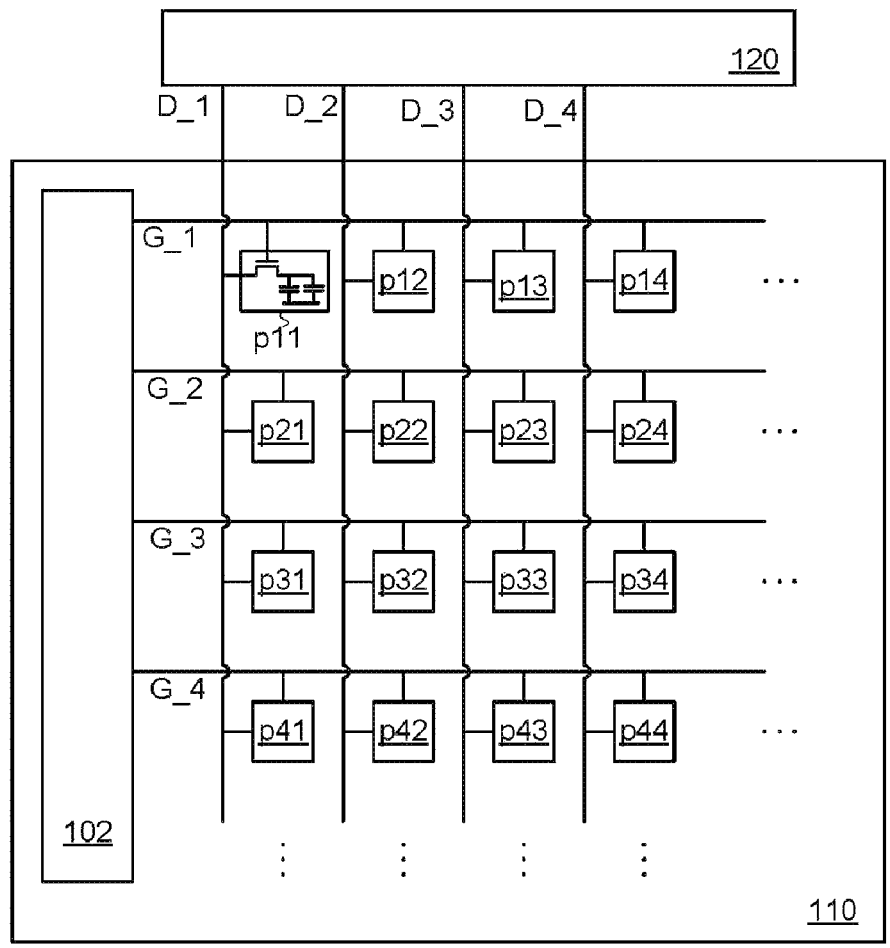
FIG. 1 is a schematic diagram of a conventional Liquid crystal display device.
Figure 2A:
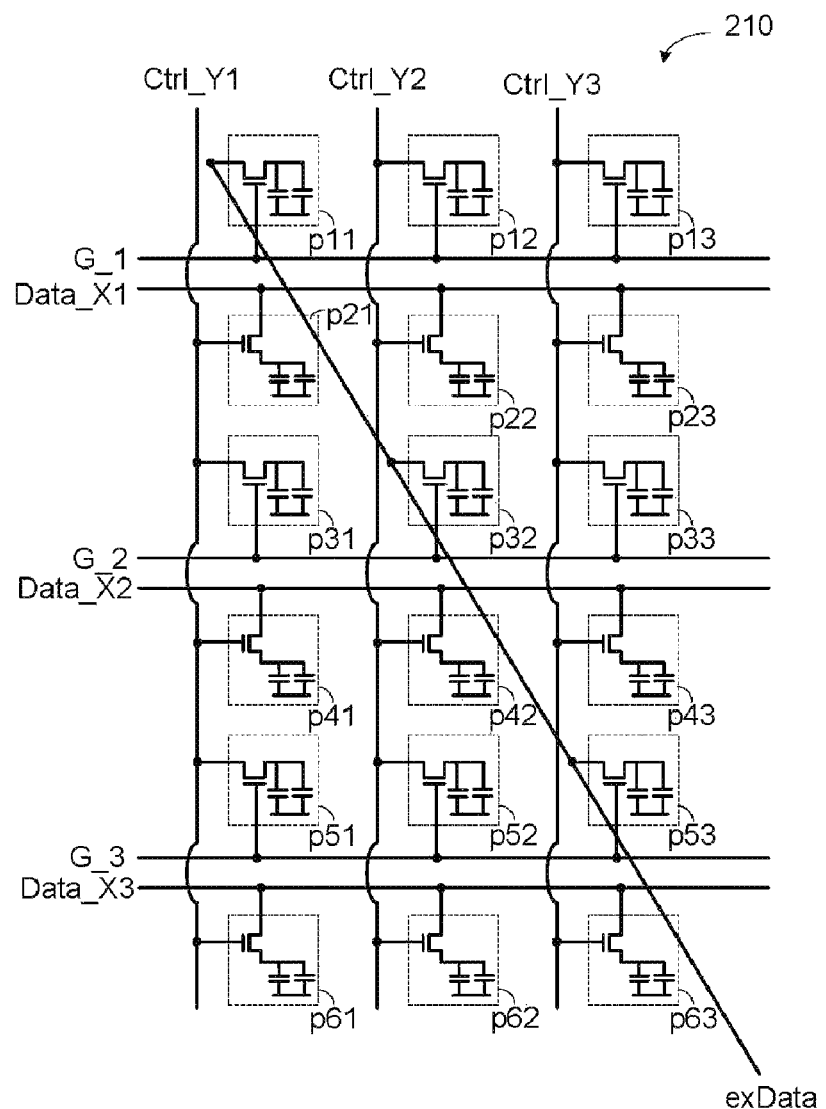
FIG. 2A is a schematic diagram of an Liquid crystal display panel according to the present invention.

Referring to FIG. 2A, FIG. 2A is a schematic diagram of an Liquid crystal display panel according to the present invention. The Liquid crystal display panel 210 of the present invention is applicable to a high-resolution Liquid crystal display device. The Liquid crystal display panel 210 includes pixel elements p11 to p63. The pixel elements p11 to p63 are a 6×3 pixel array. The pixel elements p11 to p63 are of a same structure and each include a switching transistor, a liquid crystal capacitor, and a storage capacitor.

A gate terminal of the switching transistor is a scan terminal of the liquid crystal unit, and a first drain/source terminal of the switching transistor is a data terminal of the liquid crystal unit. The liquid crystal capacitor is in parallel connection with the storage capacitor, and is connected to a second drain/source terminal of the switching transistor.

Further, the Liquid crystal display panel 210 receives gate driving signals G_1 to G_3, data signals Data_X1 to Data_X3, an extra data signal exData, and control signals Ctrl_Y1 to Ctrl_Y3.

According to an embodiment of the present invention, for the first row of pixel elements p11 to p13, the scan terminals thereof receive the gate driving signal G_1, the data terminal of the pixel element p11 receives the extra data signal exData, the data terminal of the pixel element p12 receives the control signal Ctrl_Y2, and the data terminal of the pixel element p13 receives the control signal Ctrl_Y3.

For the second row of pixel elements p21 to p23, the data terminals thereof receive the data signal Data_X1, the scan terminal of the pixel element p21 receives the control signal Ctrl_Y1, the scan terminal of the pixel element p22 receives the control signal Ctrl_Y2, and the scan terminal of the pixel element p23 receives the control signal Ctrl_Y3.

For the third row of pixel elements p31 to p33, the scan terminals thereof receive the gate driving signal G_2, the data terminal of the pixel element p31 receives the control signal Ctrl_Y1, the data terminal of the pixel element p32 receives the extra data signal exData, and the data terminal of the pixel element p33 receives the control signal Ctrl_Y3.

For the fourth row of pixel elements p41 to p23, the data terminals thereof receive the data signal Data_X2, the scan terminal of the pixel element p41 receives the control signal Ctrl_Y1, the scan terminal of the pixel element p42 receives the control signal Ctrl_Y2, and the scan terminal of the pixel element p43 receives the control signal Ctrl_Y3.

For the fifth row of pixel elements p51 to p53, the scan terminals thereof receive the gate driving signal G_3, the data terminal of the pixel element p51 receives the control signal Ctrl_Y1, the data terminal of the pixel element p52 receives the control signal Ctrl_Y2, and the data terminal of the pixel element p53 receives the extra data signal exData.

For the sixth row of pixel elements p61 to p63, the data terminals thereof receive the data signal Data_X3, the scan terminal of the pixel element p61 receives the control signal Ctrl_Y1, the scan terminal of the pixel element p62 receives the control signal Ctrl_Y2, and the scan terminal of the pixel element p63 receives the control signal Ctrl_Y3.

In FIG. 2A, the 6×3 pixel array is merely used as an example to describe the Liquid crystal display panel of the present invention, and the pixel array may also be extended to an Liquid crystal display panel with another size by a person skilled in the art. An example in which a liquid crystal screen is a 2n*m pixel array is used for description below, where n and m are positive integers.

In the pixel array, the $(2n-1)^{th}$ row has m pixel elements $p[(2n-1),x]$, where x is any positive integer from 1 to m. Scan terminals of all the pixel elements receive a gate driving signal G_n. Further, for a pixel element $p[(2n-1),x]$, where x=n, a data terminal thereof receives an extra data signal exData, and for the other (m−1) pixel elements $p[(2n-1),x]$, where x≠n, data terminals thereof respectively receive control signals Ctrl_Yx.

In the pixel array, the $(2n)^{th}$ row has m pixel elements $p[(2n),x]$, where x is any positive integer from 1 to m. Data terminals of all the pixel elements are connected to a data signal Data_Xn. Further, scan terminals of the m pixel elements $p[(2n),x]$ receive the control signal Ctrl_Yx.

An example in which n=3 and m=3 is used for description. In the fifth row (2*3−1=5) of the pixel array, scan terminals of the three pixel elements p51 to p53 receive a gate driving signal G_3. A data terminal of the pixel element p53 receives an extra data signal exData, and data terminals of the other two pixel elements p51 and p52 respectively receive a control signal Ctrl_Y1 and a control signal Ctrl_Y2.

In the sixth row (2*3=6) of the pixel array, data terminals of all the three pixel elements p61 to p63 receive a data signal Data_X3. Scan terminals of the three pixel elements p61 to p63 respectively receive the control signal Ctrl_Y1, the control signal Ctrl_Y2, and a control signal Ctrl_Y3.

According to an embodiment of the present invention, gate driving signals G_1 to G_3 sequentially produce gate pulses, data signals Data_X1 to Data_X3 produce data voltages, the extra data signal exData produces a data voltage, and the control signals Ctrl_Y1 to Ctrl_Y3 produce signals mixing a gate pulse with a data voltage. That is, the gate pulses in the control signal Ctrl_Y1 to Ctrl_Y3 may be used for enabling pixel elements, and the data voltages may be written to the pixel elements. A detailed description is given below.

Figure 2B:
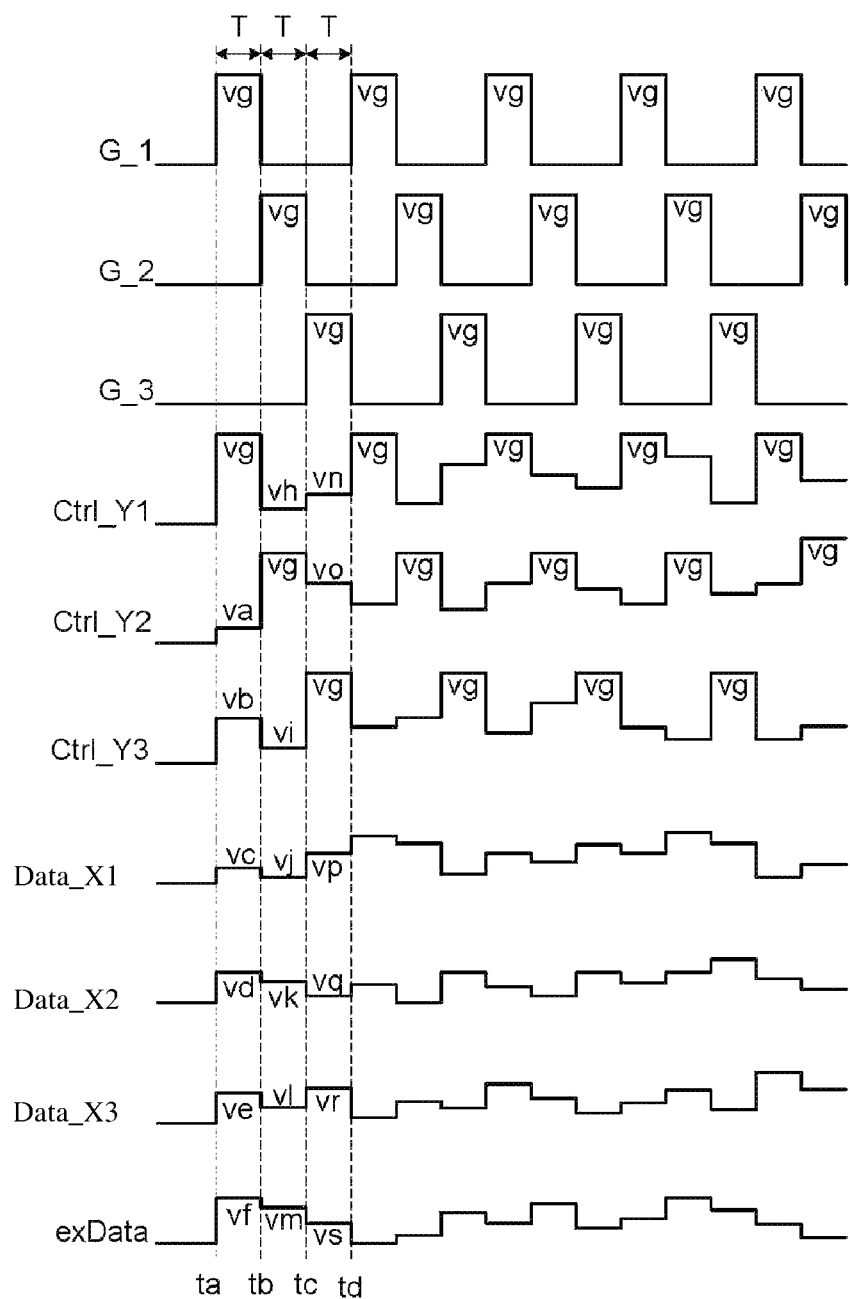
FIG. 2B is a schematic diagram of related signals applied to the Liquid crystal display panel according to the present invention.

Referring to FIG. 2B, FIG. 2B is a schematic diagram of related signals applied to the Liquid crystal display panel according to the present invention. The gate driving signals G_1 to G_3 sequentially produce gate pulses, and each gate pulse has a pulse width T and an amplitude of vg. In the data signals Data_X1 to Data_X3 and the extra data signal exData, a data voltage is changed after every time length T. The amplitude of the gate pulse is greater than all data voltages.

Further, the control signals Ctrl_Y1 to Ctrl_Y3 are signals mixing a gate pulse with a data voltage. The control signal Ctrl_Y1 and the gate driving signal G_1 produce gate pulses in a same time period, and the control signal Ctrl_Y1 produces a data voltage in the other time periods. Similarly, the control signal Ctrl_Y2 and the gate driving signal G_2 produce gate pulses in a same time period, and the control signal Ctrl_Y2 produces a data voltage in the other time periods. The control signal Ctrl_Y3 and the gate driving signal G_3 produce gate pulses in a same time period, and the control signal Ctrl_Y3 produces a data voltage in the other time periods.

Figure 2C:
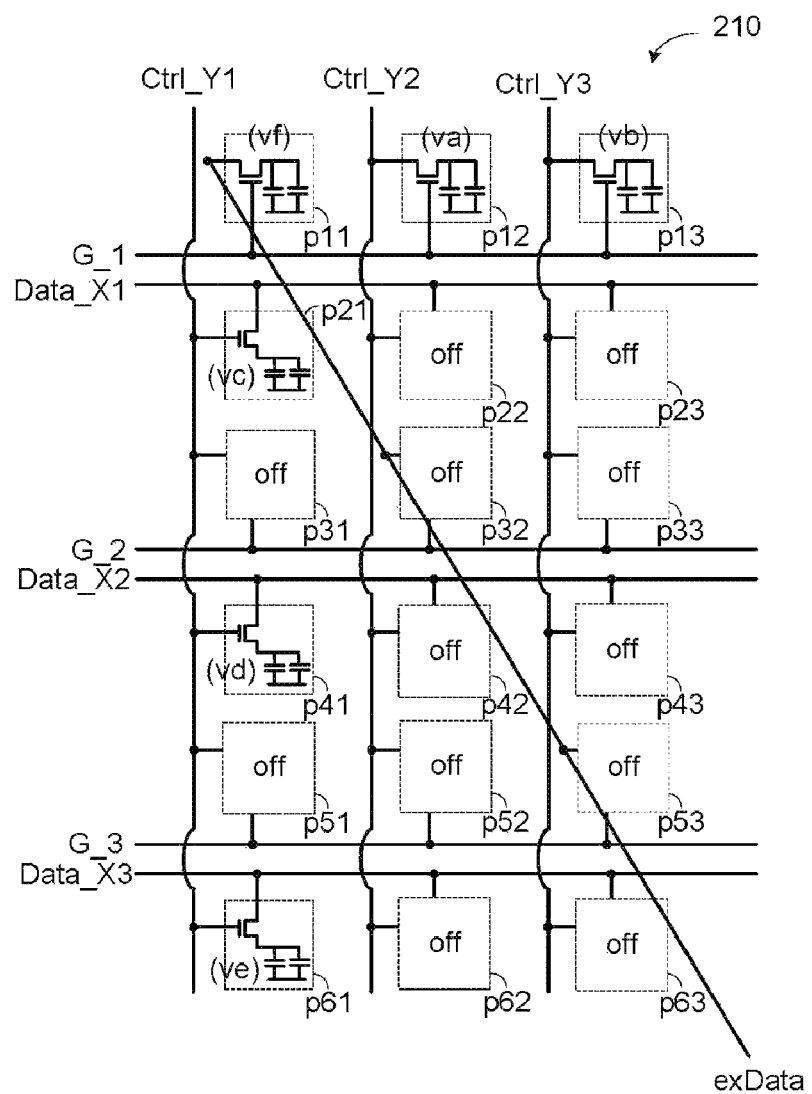
FIG. 2C to FIG. 2F are schematic diagrams of applying the signals in FIG. 2B to the Liquid crystal display panel according to the present invention.

Referring to FIG. 2C to FIG. 2F, FIG. 2C to FIG. 2F are schematic diagrams of applying the foregoing signals to the Liquid crystal display panel according to the present invention. As shown in FIG. 2C, between a time point to and a time point tb, the gate driving signal G_1 and the control signal Ctrl_Y1 produce gate pulses having the amplitude vg, and data voltages of the control signal Ctrl_Y2, the control signal Ctrl_Y3, the data signals Data_X1 to Data_X3, and the extra data signal exData are sequentially va, vb, vc, vd, ve, and vf.

Because the gate driving signal G_1 and the control signal Ctrl_Y1 produce the gate pulses, the six pixel elements p11 to p13, p21, p41, and p61 are enabled, and the other pixel elements are off. The pixel element p11 stores the data voltage vf of the extra data signal exData, the pixel element p12 stores the data voltage va of the control signal Ctrl_Y2, the pixel element p13 stores the data voltage vb of the control signal Ctrl_Y3, the pixel element p21 stores the data voltage vc of the data signal Data_X1, the pixel element p41 stores the data voltage vd of the data signal Data_X2, and the pixel element p61 stores the data voltage ve of the data signal Data_X3.

Figure 2D:
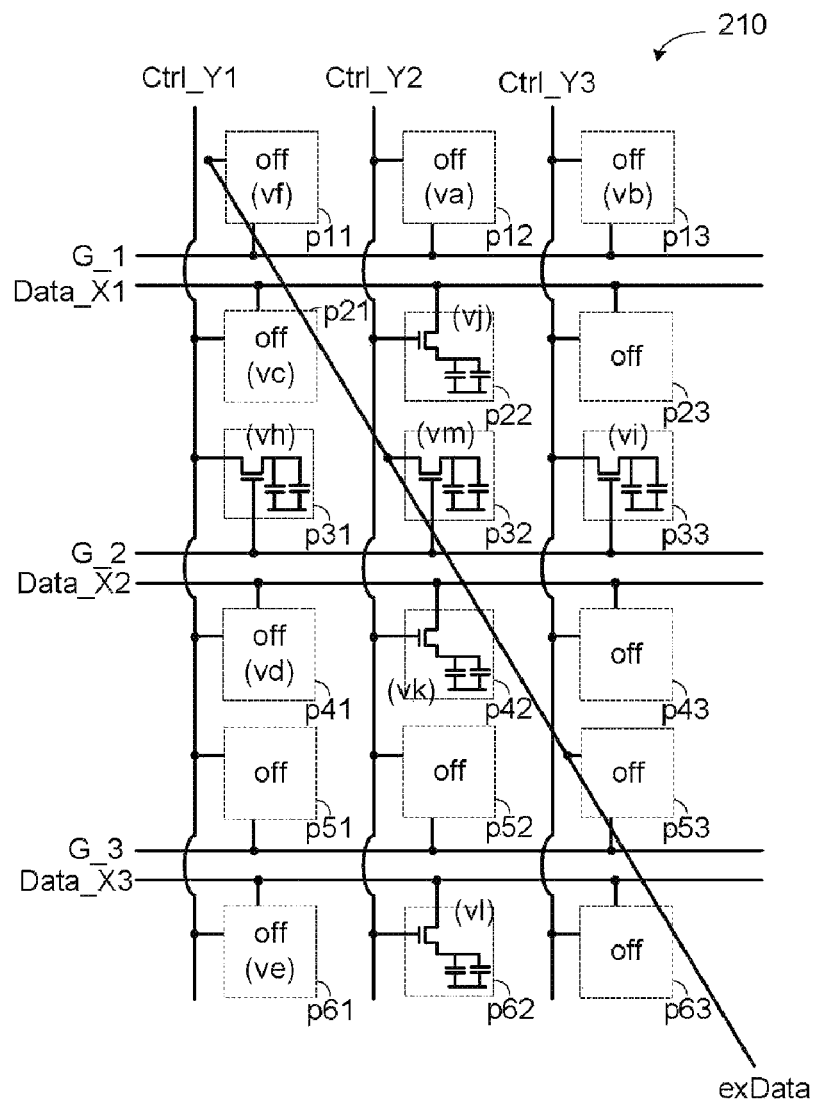

As shown in FIG. 2D, between the time point tb and a time point tc, the gate driving signal G_2 and the control signal Ctrl_Y2 produce gate pulses having the amplitude vg, and data voltages of the control signal Ctrl_Y1, the control signal Ctrl_Y3, the data signals Data_X1 to Data_X3, and the extra data signal exData are sequentially vh, vi, vj, vk, vl, and vm.

Because the gate driving signal G_2 and the control signal Ctrl_Y2 produce the gate pulses, the six pixel elements p31 to p33, p22, p42, and p62 are enabled, and the other pixel elements are off. The pixel element p32 stores the data voltage vm of the extra data signal exData, the pixel element p31 stores the data voltage vh of the control signal Ctrl_Y1, the pixel element p33 stores the data voltage vi of the control signal Ctrl_Y3, the pixel element p22 stores the data voltage vj of the data signal Data_X1, the pixel element p42 stores the data voltage vk of the data signal Data_X2, and the pixel element p62 stores the data voltage vl of the data signal Data_X3.

Figure 2E:
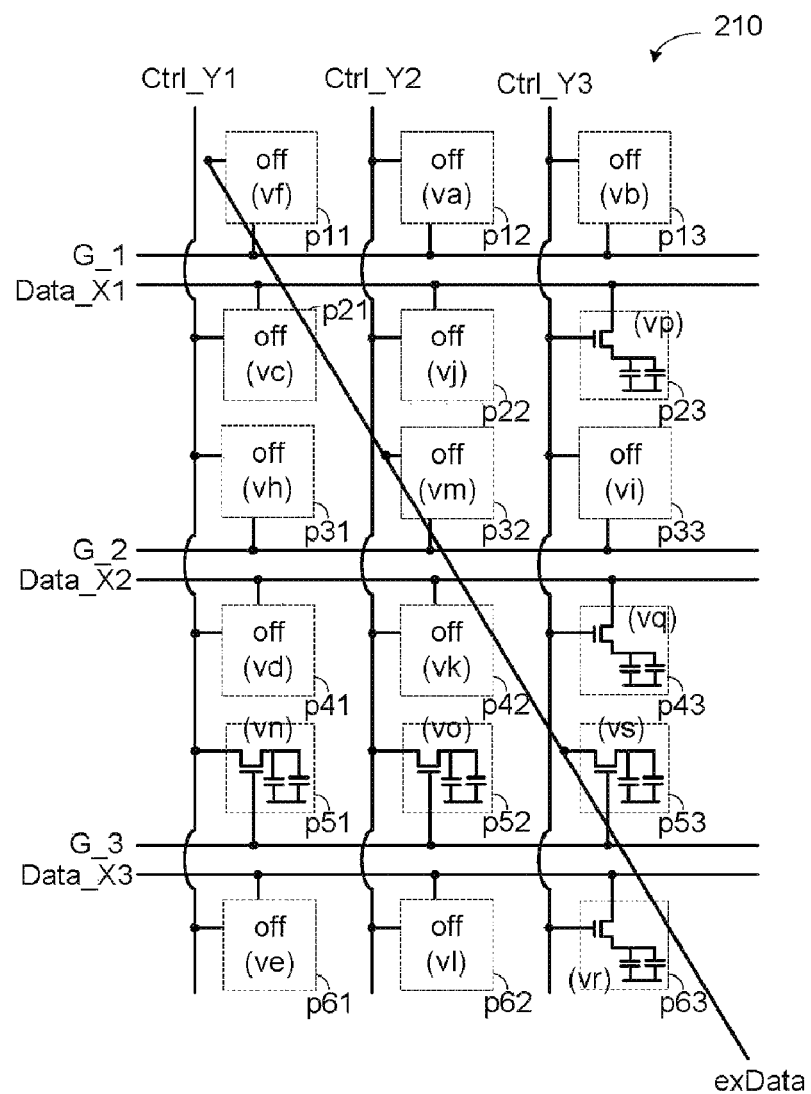

As shown in FIG. 2E, between the time point tc and a time point td, the gate driving signal G_3 and the control signal Ctrl_Y3 produce gate pulses having the amplitude vg, and data voltages of the control signal Ctrl_Y1, the control signal Ctrl_Y2, the data signals Data_X1 to Data_X3, and the extra data signal exData are sequentially vn, vo, vp, vq, vr, and vs.

Because the gate driving signal G_3 and the control signal Ctrl_Y3 produce the gate pulses, the six pixel elements p51 to p53, p23, p43, and p63 are enabled, and the other pixel elements are off. The pixel element p53 stores the data voltage vs of the extra data signal exData, the pixel element p51 stores the data voltage vn of the control signal Ctrl_Y1, the pixel element p52 stores the data voltage vo of the control signal Ctrl_Y2, the pixel element p23 stores the data voltage vp of the data signal Data_X1, the pixel element p43 stores the data voltage vq of the data signal Data_X2, and the pixel element p63 stores the data voltage vr of the data signal Data_X3.

Figure 2F:
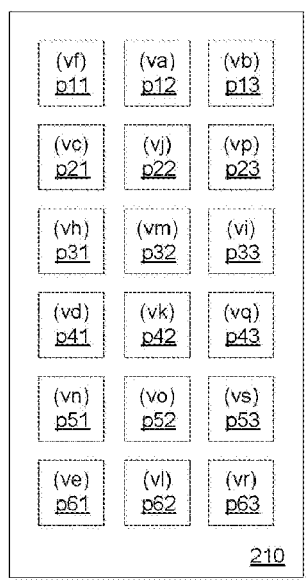

Therefore, as shown in FIG. 2F, after the time point td from the time point ta, all the pixel elements p11 to p63 in the Liquid crystal display panel 210 store data voltages, so as to update a frame of the Liquid crystal display panel 210.

Further, after the time point td, the gate driving signals G_1 to G_3 continuously sequentially produce gate pulses, so as to update a frame of the Liquid crystal display panel 210. An operation principle is the same, and is therefore not described again.

Figure 3:
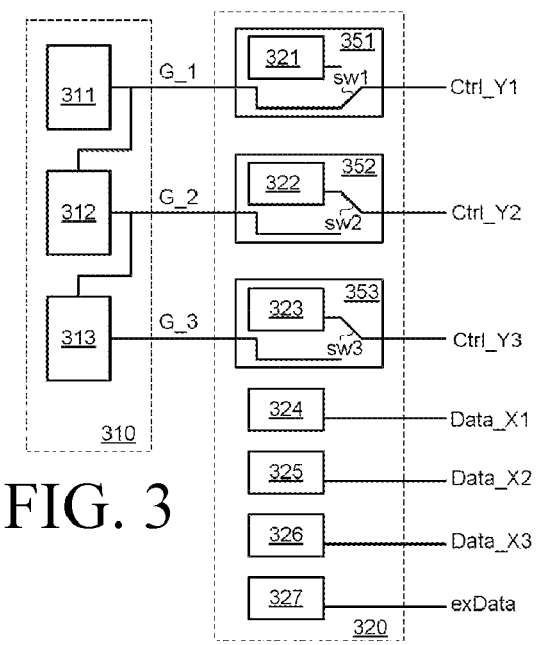
FIG. 3 shows a gate driving circuit and a data driving circuit applied to an Liquid crystal display device according to the present invention.

Referring to FIG. 3, FIG. 3 shows a gate driving circuit and a data driving circuit applied to an Liquid crystal display device according to the present invention. The gate driving circuit and the data driving circuit are configured to generate the gate driving signals G_1 to G_3, the control signals Ctrl_Y1 to Ctrl_Y3, the data signals Data_X1 to Data_X3, and the extra data signal exData having the features of the present invention.

The gate driving circuit 310 includes gate pulse generators 311 to 313 in series connection, which can sequentially generate the gate driving signals G_1 to G_3. That is, the gate pulse generator 312 generates the gate driving signal G_2 according to the gate driving signal G_1, and the gate pulse generator 313 generates the gate driving signal G_3 according to the gate driving signal G_2.

The data driving circuit 320 includes control signal generators 351 to 353 and data signal generators 324 to 327. The data signal generators 324 to 327 respectively generate the data signals Data_X1 to Data_X3 and the extra data signal exData.

Further, the control signal generator 351 includes a switching circuit sw1 and a data signal generator 321. When the control signal generator 351 receives a gate pulse in the gate driving signal G_1, the switching circuit sw1 uses the gate pulse as the control signal Ctrl_Y1 in the time period, and the switching circuit sw1 is connected to the data signal generator 321 in the other time periods to use a data voltage as the control signal Ctrl_Y1.

Similarly, the control signal generator 352 includes a switching circuit sw2 and a data signal generator 322, and the control signal generator 353 includes a switching circuit sw3 and a data signal generator 323. Operation principles thereof are the same as that of the control signal generator 351, and are not described again.

It can be learned from the above description that the present invention provides an Liquid crystal display device with a new architecture. The Liquid crystal display panel thereof receives the gate driving signals G_1 to G_3, the data signals Data_X1 to Data_X3, the extra data signal exData, and the control signals Ctrl_Y1 to Ctrl_Y3. Further, the control signals Ctrl_Y1 to Ctrl_Y3 include the gate pulses and the data voltages, the gate pulses are used for enabling the pixel elements, and the data voltages are stored in the liquid crystal capacitors and the storage capacitors.

Further, by using the foregoing signals and the connection manner of the pixel elements, the Liquid crystal display panel 210 can enable pixel scanning both from top to bottom and from left to right. Therefore, compared with the conventional Liquid crystal display panel capable of only pixel scanning from top to bottom, the scanning manner of the Liquid crystal display panel 210 of the present invention can provide a longer data voltage write time, so as to alleviate gray-scale distortion of a high-resolution Liquid crystal display panel due to an insufficient data voltage write time.

In conclusion, although the present invention is disclosed above by using embodiments, the embodiments are not intended to limit the present invention. A person of ordinary skill in the art of the present invention may make various changes and modifications without departing from the spirit and scope of the present invention. Therefore, the protection scope of the present invention shall be subject to the scope defined by the attached claims.

What is claimed is:

1. A liquid crystal display panel, receiving a plurality of data signals, a plurality of gate driving signals, a plurality of control signals, and an extra data signal, comprising:
   a plurality of pixel elements arranged as a pixel array;
   wherein the pixel array comprises:
      a $(2n-1)^{th}$ row, having m pixel elements p[(2n-1),x], wherein n and m are positive integers, and x is any positive integer from 1 to m; and
      a $(2n)^{th}$ row, having m pixel elements p[(2n),x];
   wherein in the $(2n-1)^{th}$ row, scan terminals of the m pixel elements p[(2n-1),x] receive the gate driving signals;
   wherein in the $(2n-1)^{th}$ row, a data terminal of a pixel element p[(2n-1),x] receives the extra data signal via an extra data signal line, and x equals to n;
   wherein in the $(2n-1)^{th}$ row, data terminals of the other (m−1) pixel elements p[(2n-1),x] not receiving the extra data signal correspondingly receive an $x^{th}$ control signal via an $x^{th}$ control signal line, where x is not equal to n;

wherein in the $(2n)^{th}$ row, data terminals of the m pixel elements p[(2n),x] receive an $n^{th}$ data signal; and wherein in the $(2n)^{th}$ row, scan terminals of the m pixel elements p[(2n),x] receive the corresponding $x^{th}$ control signal via the corresponding $x^{th}$ control signal line.

2. The liquid crystal display panel according to claim 1, wherein each of the pixel elements comprises:
- a switching transistor, having a gate terminal as the scan terminal of the pixel element, a first drain/source terminal as the data terminal of the liquid crystal display panel, and a second drain/source terminal;
- a liquid crystal capacitor, having a first terminal and a second terminal, wherein said first terminal connected to the second drain/source terminal of the switching transistor; and
- a storage capacitor, having a first terminal connected to the second drain/source terminal of the switching transistor, and a second terminal connected to the second terminal of the liquid crystal capacitor.

3. The liquid crystal display panel according to claim 2, wherein a gate driving circuit generates the gate driving signals, and a data driving circuit generates the control signals, the data signals, and the extra data signal.

4. The liquid crystal display panel according to claim 3, wherein the gate driving circuit comprises: a plurality of gate pulse generators in series connection, sequentially generating the gate driving signals.

5. The liquid crystal display panel according to claim 4, wherein the data driving circuit comprises:
- a plurality of control signal generators, correspondingly receiving the gate driving signals, and correspondingly generating the control signals;
- a plurality of data signal generators, generating the data signals; and
- an extra data signal generator, generating the extra data signal.

6. The liquid crystal display panel according to claim 5, wherein each of the control signal generators comprises a switching circuit and a data signal generator, and when the control signal generator receives a gate pulse in a time period, the switching circuit uses the gate pulse as the control signal in the time period, and the switching circuit uses a data voltage generated by the data signal generator as the control signal m the other time periods.

7. The liquid crystal display panel according to claim 1, wherein each of the gate driving signal produces a gate pulse, each of the data signals produces a plurality of data voltages, and the extra data signal produces a plurality of data voltages.

8. The liquid crystal display panel according to claim 7, wherein the $x^{th}$ control signals output the gate pulses of the $x^{th}$ gate driving signals in a first time period, and the $x^{th}$ control signals output a plurality of data voltages in a second time period.

9. A liquid crystal display device, comprising:
- a liquid crystal display panel comprising a plurality of pixel elements arranged as a pixel array, wherein the pixel array comprises:
  - a $(2n-1)^{th}$ row, having m pixel elements p[(2n-1),x], wherein n and m are positive integers, and x is any positive integer from 1 to m; and
  - a $(2n)^{th}$ row, having m pixel elements p[(2n),x];
  - wherein in the $(2n-1)^{th}$ row, scan terminals of the m pixel elements p[(2n-1),x] receive gate driving signals;
  - wherein in the $(2n-1)^{th}$ row, a data terminal of a pixel element p[(2n-1),x] receives the extra data signal via an extra data signal line, and x equals to n;
  - wherein in the $(2n-1)^{th}$ row, data terminals of the other (m-1) pixel elements p[(2n-1),x] not receiving the extra data signal correspondingly receive an $x^{th}$ control signal via an $x^{th}$ control signal line, where x is not equal to n;
  - wherein in the $(2n)^{th}$ row, data terminals of the m pixel elements p[(2n),x] receive an $n^{th}$ data signal; and
  - wherein in the $(2n)^{th}$ row, scan terminals of the m pixel elements p[(2n),x] receive the corresponding $x^{th}$ control signal via the corresponding $x^{th}$ control signal line;
- wherein each pixel element of said liquid crystal display panel receives either one of a plurality of data signals or one of a plurality of gate driving signals, and either one of a plurality of control signals or an extra data signal; and
- wherein each of the gate driving signals comprises a gate pulse, each of the data signals comprises a data voltage, the extra data signal comprises a data voltage, and each of the control signals comprises a gate pulse and a data voltage.

10. The liquid crystal display device according to claim 9, wherein each of the pixel elements comprises:
- a switching transistor, having a gate terminal as the scan terminal of the pixel element, a first drain/source terminal as the data terminal of the liquid crystal display panel, and a second drain/source terminal;
- a liquid crystal capacitor, having a first terminal and a second terminal, wherein said first terminal connected to the second drain/source terminal of the switching transistor; and
- a storage capacitor, having a first terminal connected to the second drain/source terminal of the switching transistor, and a second terminal connected to the second terminal of the liquid crystal capacitor.

11. The liquid crystal display device according to claim 9, wherein a gate driving circuit generates the gate driving signals, and a data driving circuit generates the control signals, the data signals, and the extra data signal.

12. The liquid crystal display device according to claim 11, wherein the gate driving circuit comprises: a plurality of gate pulse generators in series connection, sequentially generating the gate driving signals.

13. The liquid crystal display device according to claim 12, wherein the data driving circuit comprises:
- a plurality of control signal generators, correspondingly receiving the gate driving signals, and correspondingly generating the control signals;
- a plurality of data signal generators, generating the data signals; and an extra data signal generator, generating the extra data signal.

14. The liquid crystal display device according to claim 13, wherein each of the control signal generators comprises a switching circuit and a data signal generator, and when the control signal generator receives a gate pulse in a first time period, the switching circuit uses the gate pulse as the control signal in the first time period, and the switching circuit uses a data voltage generated by the data signal generator as the control signal in a second time period.

* * * * *